Figure 4:
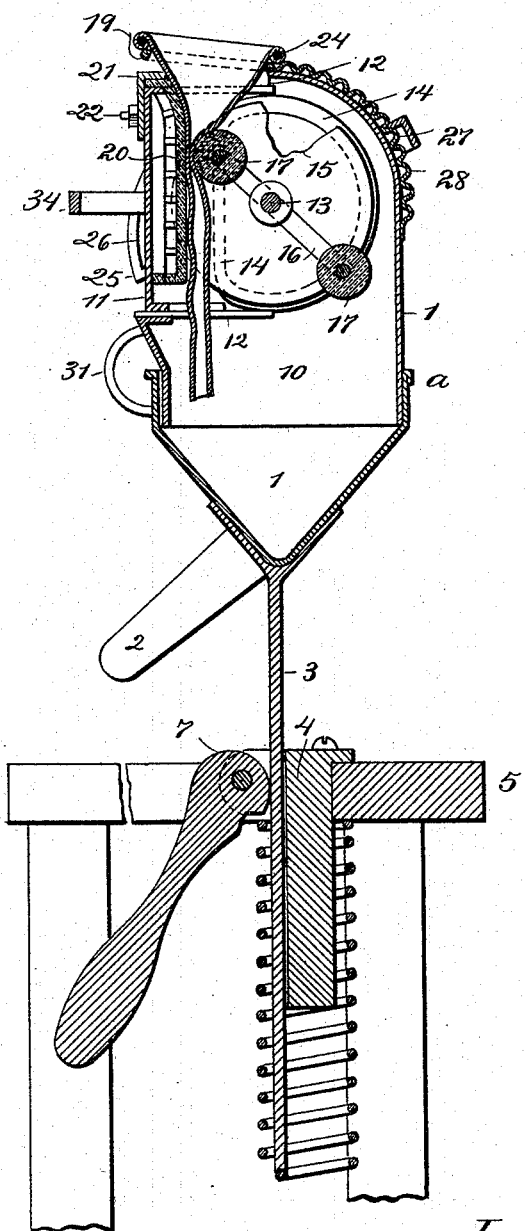

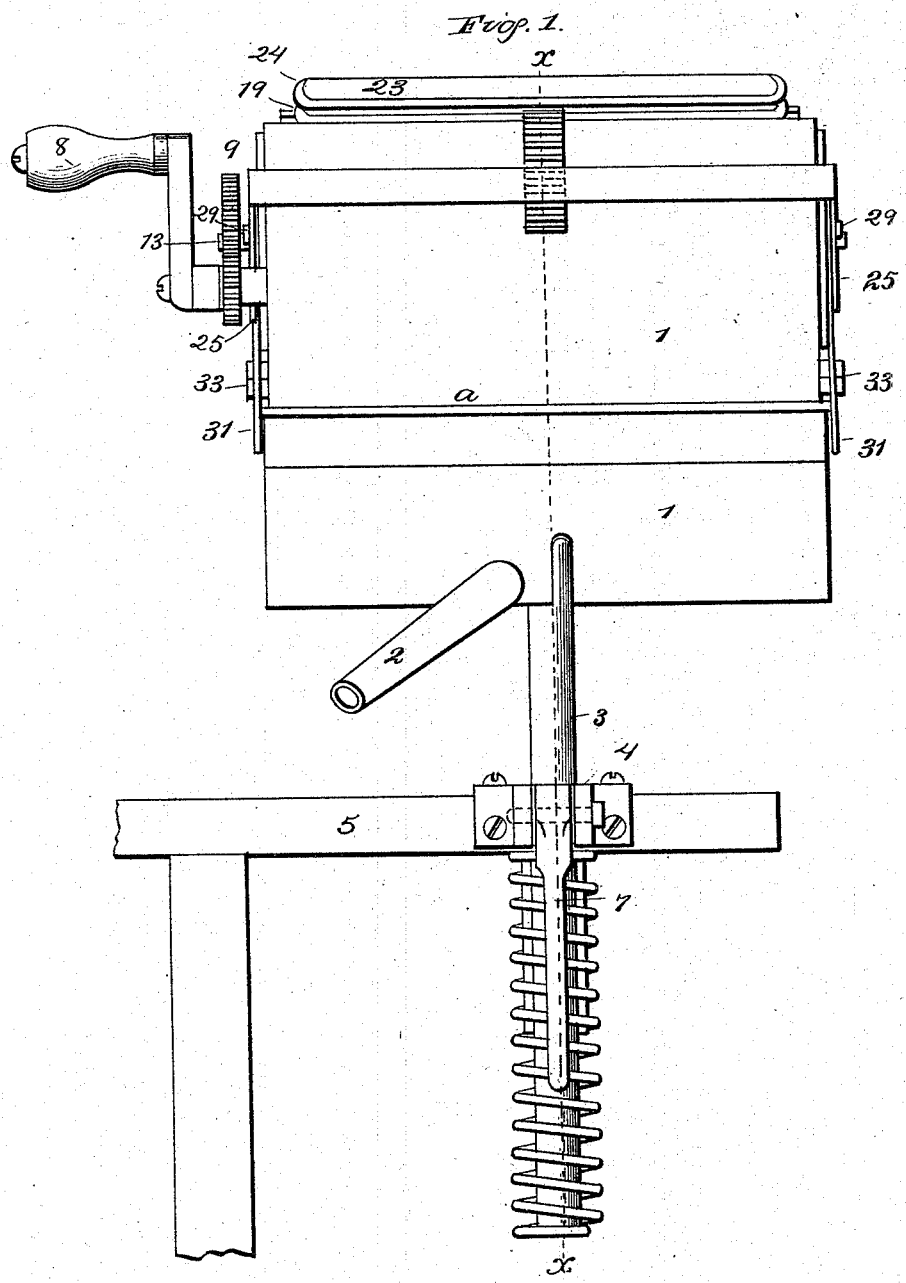

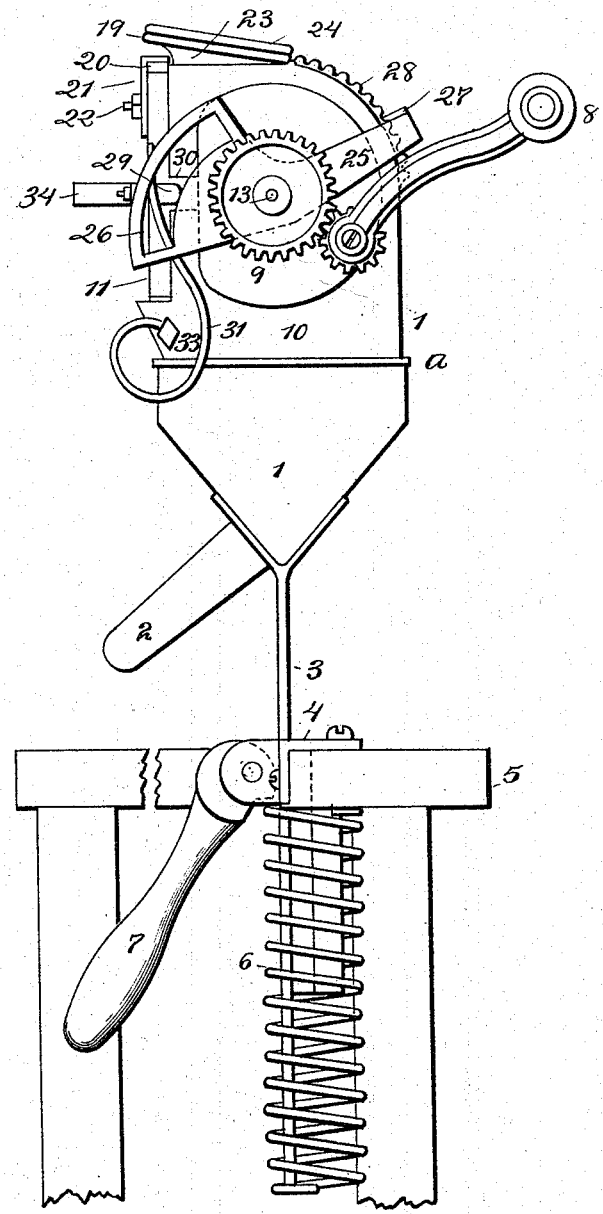

(No Model.) 4 Sheets—Sheet 3.
E. SMART.
COW MILKING MACHINE.
No. 527,893. Patented Oct. 23, 1894.
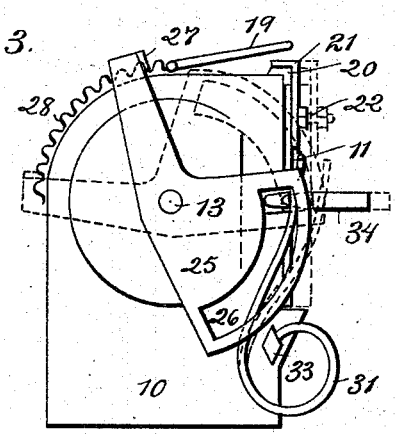
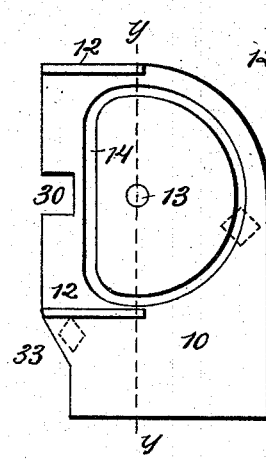
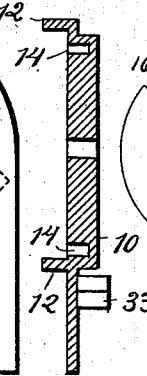
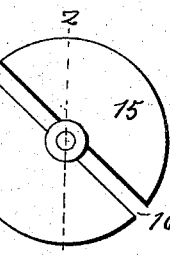
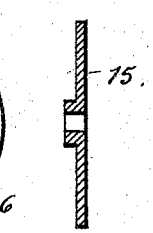
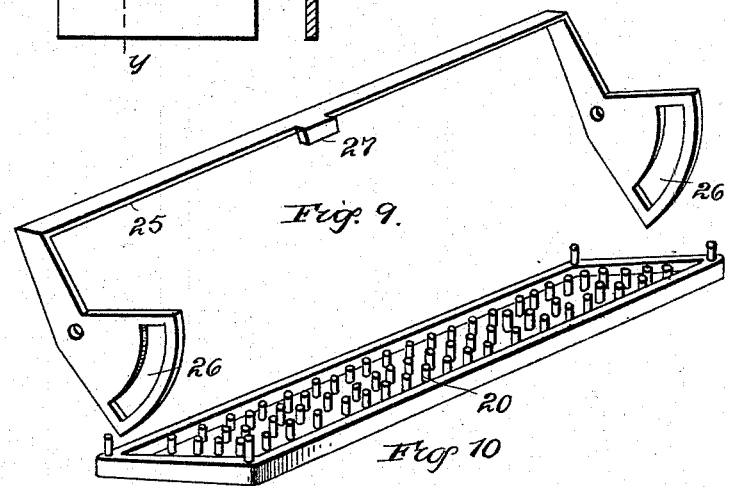
Witnesses:
John Grist
H. H. Horsey.
Inventor:
Elwood Smart
By Henry Grist
Attorney.

(No Model.) 4 Sheets—Sheet 4.

E. SMART.
COW MILKING MACHINE.

No. 527,893. Patented Oct. 23, 1894.

Witnesses:
John Grist
A. H. Horsey.

Inventor:
Elwood Smart
By Henry Grist
Attorney.

UNITED STATES PATENT OFFICE.

ELSWOOD SMART, OF BROCKVILLE, CANADA.

COW-MILKING MACHINE.

SPECIFICATION forming part of Letters Patent No. 527,893, dated October 23, 1894.

Application filed August 4, 1894. Serial No. 519,490. (No model.)

*To all whom it may concern:*

Be it known that I, ELSWOOD SMART, of Brockville, in the Province of Ontario, in the Dominion of Canada, have invented certain new and useful Improvements in Cow-Milking Machines; and I do hereby declare that the following is a full, clear, and exact description of the same, reference being had to the accompanying drawings, in which—

Figure 1 is a front elevation of my improved milking machine, and showing a portion of the stool to which the machine is attached and on which the milker sits. Fig. 2, is an elevation of one end of the same. Fig. 3, is an elevation of the opposite end omitting the lower part and showing in dotted lines the adjustment of the back of the hopper to suit larger or smaller teats. Fig. 4, is a transverse vertical section on line X X Fig. 1. Fig. 5, is a plan or diagram of the inner face of the ends of the hopper. Fig. 6, is a section of the same on line Y Y. Fig. 7, is a plan or diagram of the slotted roll-driving disk covering said ends internally of the hopper. Fig. 8, is a section of the same on line Z Z. Fig. 9, is a perspective view of the cam frame having cams or eccentric slots for adjustment of the back plate of the hopper, and Fig. 10, is a perspective view of the back of a rubber pad clamped to said back plate, showing the construction to make it soft to receive the pressure of the teats in milking.

My invention has for its object to construct a machine which will work efficiently, be readily cleaned after use, easily manipulated and adjustable to suit different udders and teats.

My invention consists of certain features of construction and combination of parts as will hereinafter be described and claimed.

1, is a hopper, constructed of an upper and lower section telescoping together at *a*, to obtain ready access to the interior, for cleansing after use.

2, is the outlet spout in the lower section of the hopper, and from which spout the milk is discharged into a pail or other receptacle. The lower section of the hopper is attached to a post 3, which passes through a clamp 4, secured to a stool 5, and said clamp is surrounded by a spiral spring 6, which supports post 3, and 7, is a cam lever which binds said post in the clamp at the height of adjustment to suit the udder of the cow.

The hopper is depressed by hand against the resistance of the spring, and said spring reacts to raise the hopper, as being the most convenient mode to effect adjustment. The milker sits on the stool near one end and the machine is near the opposite end, and the handle operating the machine is in front of the sitter, who turns it with the ordinary motion of the hand.

The upper section of the hopper is of sufficient capacity to receive two teats, and the machine adapted to milk two teats simultaneously by turning the crank handle 8, geared to a driving wheel 9. Gear is preferable, to obtain a proper and uniform speed under ordinary motion of the hand turning said handle.

The hopper at both ends is formed of plates 10, shown in Figs. 5 and 6, and said ends are connected by a front wall, which at the top curves inwardly to contract the opening for the teats, and said ends are connected by an adjustable back wall 11, having the ends turned inwardly, to slide between bearing and guide flanges 12, formed on plates 10, to move said wall more or less to increase or decrease the width of the hopper, and regulate or adjust the pressure on the teats when milking, as hereinafter set forth.

13, is a shaft journaled through the ends of the hopper and carries on one end the aforesaid driving cog wheel 9, and the end plates 10, of the hopper have a cam groove 14, which grooves for a portion of their length are parallel to the back wall of the hopper and the other portion is semi-oval or circular.

15, 15, are circular disks keyed on shaft 13, close to the end plates 10, and said disks have radial slots 16, diametrically from the circumference.

17, 17, are rubber rolls journaled through the slots 16, and into the cam grooves 14, so that by rotating the shaft, said rolls travel in the path given by the cam grooves during the frictional rotation of the rolls against the teats, and are alternately receded, to be again advanced toward the back of the hopper to engage the teats, and by the parallel movement against the resistance of the back of the hopper, said rolls force the milk from the teats.

The back of the hopper internally is lined with a rubber pad or cushion 20, which is held in position by a clamp bar 21, secured to said back by bolts 22, and said pad forms a soft cushion to gently resist the pressure on the teats by the engagement of the rolls during the time each roll is traveling parallel to said cushion or pad.

To prevent the rubber pad and rolls contaminating the milk, a bottomless cotton bag or shield 23, having an oval wire rim 24, is inserted in the mouth of the hopper to intervene said pad and rolls, and said wire rim bears on a corresponding wire rim 19, hinged to or fastened over the mouth of the hopper, to support said bag or shield. The ends of said shaft 13, project through the ends of the hopper and said ends carry, sleeved thereon, a frame 25, which extends along the front wall of the hopper and the ends of said frame are provided with a cam or eccentric slot 26. Said frame is kept in an adjustable position by a lug 27, thereon, engaging a corrugated metal ribbon 28, secured to the front exterior wall of the hopper, near the top thereof.

The back wall of the hopper is provided with lugs 29, extending from the ends into a notch 30, in the end plates 10, and said lugs project through the cam slots 26, so that by moving the frame outwardly from the top, the eccentric slots 26, force outwardly the lugs 29, and they draw out the back of the hopper, to increase the capacity for the admission of large teats.

31, 31, are wire springs, one end inserted in a fixed lug 33, at the ends of the hopper and the free ends of the springs engage the lugs 29, to react or force the back of the hopper inwardly when the lug 27, is moved upwardly, to suit smaller teats.

The lugs 29, may be connected by a bar 34, forming a handle by which the upper section of the hopper may be conveniently carried.

I claim as my invention—

1. The hopper section having an adjustable back seated between flanges on the end plates, and provided with lugs at the ends, in combination with a cam frame having an eccentric slot engaging said lugs, for movement of said back inwardly and outwardly, as set forth.

2. The hopper section having an adjustable back provided with a flexible cushion or pad, a shaft provided with slotted disks carrying rolls journaled to travel in an eccentric groove at the ends of said hopper section, a pivoted or movable cam frame extending from end to end of said section and engaging said adjustable back, and springs for holding said back against the pressure of the rolls when rotated thereagainst, as set forth.

3. The hopper section having an adjustable back provided with a rubber cushion or pad clamped thereto, a shaft journaled through the ends of the hopper section, said ends having a cam groove, slotted disks keyed on said shaft, rolls journaled through said slots and into said cam grooves, a bottomless textile bag suspended in said hopper intermediate of said pad and rolls, a pivoted or movable cam frame for adjusting said hopper-back, an operating gear to rotate said shaft by hand, and a lower hopper section adjustably attached to a stool and supporting said upper section and operating as and for the purpose set forth.

4. The milking hopper constructed in two separable sections, the upper section having an adjustable back, a shaft mounted through the ends of said upper section and carrying slotted disks, rolls journaled through the slots in said disks and into a cam groove in the ends of the hopper, a movable cam frame carried by the ends of said shaft for adjusting the back of the hopper, and a lower section supporting said upper section removably, and adjustably attached to a stool, to move both sections vertically, as set forth.

5. The combination in a cow milking machine, of a hopper consisting of upper and lower sections removably secured together, the upper section being provided with an adjustable back, a cushion secured to said back, means for adjusting said back simultaneously at both ends, a rotary shaft, rolls carried by said shaft, and means for imparting an eccentric movement to said rolls during their movement with said shaft, substantially as described.

ELSWOOD SMART.

Witnesses:
 A. A. FISHER,
 H. C. GATES.